United States Patent
Moriya et al.

[11] Patent Number: 5,924,395
[45] Date of Patent: Jul. 20, 1999

[54] SYSTEM FOR REGULATING VALVE TIMING OF INTERNAL COMBUSTION ENGINE

[75] Inventors: Yoshihito Moriya, Nagoya; Kiyoshi Sugimoto, Okazaki, both of Japan

[73] Assignee: Toyota Jidosha Kabushiki Kaisha, Toyota, Japan

[21] Appl. No.: 09/013,474

[22] Filed: Jan. 26, 1998

[30] Foreign Application Priority Data

Feb. 14, 1997 [JP] Japan ..................... 9-047328

[51] Int. Cl.⁶ ........................................... F01L 1/34
[52] U.S. Cl. ..................... 123/90.15; 123/90.17; 123/179.18
[58] Field of Search ............. 123/90.15, 90.16, 123/90.17, 90.31, 179.18

[56] References Cited

U.S. PATENT DOCUMENTS

| | | | |
|---|---|---|---|
| 5,398,502 | 3/1995 | Watanabe | 123/90.15 |
| 5,517,955 | 5/1996 | Yoshioka | 123/90.15 |
| 5,529,034 | 6/1996 | Sone et al. | 123/90.15 |
| 5,692,464 | 12/1997 | Kimura | 123/90.15 |

FOREIGN PATENT DOCUMENTS

| | | |
|---|---|---|
| A1-19623818 | 12/1996 | Germany . |
| A-6-26368 | 2/1994 | Japan . |
| A-8-121122 | 5/1996 | Japan . |
| A-9-21336 | 1/1997 | Japan . |
| A-9-60507 | 3/1997 | Japan . |
| A-9-60508 | 3/1997 | Japan . |
| 2-302-391 | 1/1997 | United Kingdom . |
| WO 89/00643 | 1/1989 | WIPO . |

*Primary Examiner*—Weilun Lo
*Attorney, Agent, or Firm*—Oliff & Berridge, PLC

[57] ABSTRACT

To start an internal combustion engine at appropriate intake valve close timing. A valve timing regulation system 10 regulates oil pressure supplied to advance chambers and retard chambers formed by a vane 29 and a housing 28 to advance or retard the vane 29 and change the open/close timing of the intake valve. The position of the vane 29 is fixed by inserting a lock pin 43 into an advance-side engagement hole 49A at the most advanced position. Engine stopping is effected so as to set the vane 29 at the middle position, while starting when the coolant temperature is low is effected after rotating the crankshaft backward by a prescribed angle to fix the vane 29 at the most advanced position and is effected when the temperature is high merely by cranking to fix the vane 29 at the most retarded position. Cold starting is easy when effected at the most advanced position because the compression pressure is high, while vibration at warm starting is reduced when starting is effected at the most retarded position because the compression pressure is reduced.

20 Claims, 10 Drawing Sheets

Direction of intake-side camshaft rotation

Direction of intake-side camshaft rotation

SYSTEM FOR REGULATING VALVE TIMING OF INTERNAL COMBUSTION ENGINE

BACKGROUND OF THE INVENTION

1. Field of the Invention

This invention relates to a system for regulating the valve timing of an internal combustion engine, particularly to a system for regulating the valve timing of an internal combustion engine that regulates the close times of the intake valves of the engine in a range beyond the compression stroke start point (normally bottom dead center in terms of crankshaft angle).

2. Description of the Related Art

Japanese Patent Laid-open Gazette No. 8-121122, for example, teaches a prior art system for regulating the valve timing of an internal combustion engine of this type wherein the opening/closing times of the intake valves of the engine are changed by changing the camshaft rotation phase relative to the crankshaft. This system includes a housing that rotates synchronously with the crankshaft, a vane rotatable relative to a housing connected to the camshaft, an advance chamber whose volume is expanded by oil inflow to advance the rotation phase of the vane relative to the crankshaft, and a retard chamber whose volume is expanded by oil inflow to retard the rotation phase of the vane relative to the crankshaft. The system controls the inflow of oil to the advance chamber and the retard chamber to change the rotation phase of the camshaft for driving the intake valves relative to the crankshaft and thereby change the opening/closing times of the intake valves. When this type of valve timing regulation system is used, however, it sometimes becomes impossible to properly start the engine. In general, engine intake valve closing is effected at a rotation angle after (45 degrees after, for example) the time point at which the intake stroke ends and the compression stroke starts (normally at bottom dead center of the crankshaft) so as to utilize the inertia of the intake air for charging as much air-fuel mixture into the cylinder as possible. Therefore, if the next starting of the engine is conducted using the opening/closing timing in effect when the engine was stopped, proper engine starting may become impossible depending on the intake valve close timing. For instance, when the engine has completely cooled down and an attempt is made to start it with the intake valve close timing still retarded, starting may be difficult since the compression pressure at starting is apt to be insufficient owing to the intake valves being open even after the compression stroke has started. This problem is pronounced when the intake valve close timing of the engine is set on the retard side in order to reduce knocking/vibration or improve fuel economy.

On the other hand, when the engine is thoroughly warmed up and an attempt is made to start it with the intake valve close timing advanced, the compression pressure rises excessively and the engine is apt to vibrate violently upon starting.

SUMMARY OF THE INVENTION

An object of the system for regulating the valve timing of an internal combustion engine according to this invention is to optimize intake valve close timing. Another object of the invention is to achieve said object with a simple configuration.

Another object of the invention is, in a valve timing regulation system of the type that drives a pump for producing oil pressure supplied to an advance chamber and/or a retard chamber by power taken from the engine, to properly control intake valve close timing at engine starting even though oil pressure cannot be produced when the engine is stopped.

The first and second systems for regulating the valve timing of an internal combustion engine according to the invention at least partially achieve the foregoing objects by adopting the following means.

The first system for regulating the valve timing of an internal combustion engine according to the invention is a valve timing regulation system for regulating at least the close timing of intake valves for opening/closing intake ports of the internal combustion engine, the system comprising:

intake valves operating in response to a rotation angle of a crankshaft for closing the intake ports when the rotation angle of the crankshaft is in a prescribed range, timing changing means for changing the intake valve close timing by changing a response relationship of the intake valves with respect to the rotation angle of the crankshaft, condition detecting means for detecting the state of a condition affecting engine starting difficulty, timing setting means responsive to an engine start request for setting the intake valve close timing based on the state of the engine condition detected by the condition detecting means, and timing control means for controlling the timing changing means to cause the intake valves to be in a closed state at times defined by the set intake valve close timing at engine starting.

In this first system for regulating the valve timing of an internal combustion engine according to the invention, the timing setting means responds to an engine start request by setting the intake valve close timing based on the state of a condition affecting engine starting difficulty detected by the condition detecting means. The timing control means controls the timing changing means for changing the intake valve close timing by changing the response relationship of the intake valves with respect to the rotation angle of the crankshaft so as to start the engine at the set close timing.

The "condition affecting engine starting difficulty" encompasses the state of engine warmup and the like and, for example, includes engine temperature and/or time passed since the engine was stopped. Conceivable configurations therefore include, for example, one in which the condition detecting means is engine temperature detection means and the intake valve close timing is set based on whether or not the engine temperature is lower than a prescribed temperature. Otherwise, a configuration can be adopted wherein the condition detecting means is means for detecting time passed since the engine was stopped and the intake valve close timing is set based on whether or not longer than a prescribed time has passed since the engine was stopped.

Since the first system for regulating the valve timing of an internal combustion engine according to the invention sets the intake valve close timing based on the state of a condition affecting engine starting difficulty, the intake valves can be set to a close timing that makes the engine easy to start, whereby the engine can be readily started. Therefore, engine starting difficulty owing to insufficient compression pressure at engine starting, strong vibration of the engine upon starting owing to excessive compression pressure, and other such problems can be avoided.

In the first system for regulating the valve timing of an internal combustion engine according to the invention, the timing setting means can be means for setting the intake valve close timing to advance the intake valve closing times by a prescribed angle when the condition of the engine detected by the condition detecting means is in a prescribed state. In this aspect of the valve timing regulation system, the timing changing means can be equipped with advance angle fixing means for fixing the response relationship of the intake valves with respect to the rotation angle of the crankshaft so that the intake valve close timing advances the intake valve closing times by the prescribed angle. Further, in this aspect of the valve timing regulation system, a configuration can be adopted wherein an electric motor is provided for rotating the crankshaft and the timing control means is adapted to operate the advance angle fixing means by causing the motor to rotate the crankshaft backward by a prescribed angle based on the setting made by the timing setting means. With this configuration, the intake valve close timing can be changed even if the pump for producing oil pressure is driven by power taken from the engine.

In the first system for regulating the valve timing of an internal combustion engine according to the invention, including the foregoing modified configurations, the timing setting means can be means for setting the intake valve close timing to retard the intake valve closing times by a prescribed angle when the condition of the engine detected by the condition detecting means is in a prescribed state making the engine easy to start. In this aspect of the valve timing regulation system, the timing changing means can be equipped with retard angle fixing means for fixing the response relationship of the intake valves with respect to the rotation angle of the crankshaft so that the intake valve close timing retards the intake valve closing times by the prescribed angle and the timing control means can be means for controlling the retard angle fixing means based on the setting made by the timing setting means.

Moreover, the first system for regulating the valve timing of an internal combustion engine can further comprise:

Advance angle fixing means for, by changing the response relationship of the intake valves with respect to the rotation angle of the crankshaft, fixing the intake valve close timing to fix the intake valve closing times at the prescribed advance angle, retard angle fixing means for, by changing the response relationship of the intake valves with respect to the rotation angle of the crankshaft, fixing the intake valve close timing to fix the intake valve closing times at the prescribed retard angle, and stop control means responsive to an engine stop request for controlling the intake valve close timing to set the intake valve closing times between the prescribed advance angle and the prescribed retard angle when the engine stops, the timing setting means being means for setting the intake valve close timing to advance the intake valve closing times by a prescribed angle when the condition of the engine detected by the condition detecting means is in a prescribed state and setting the intake valve close timing to retard the intake valve closing times by a prescribed angle when the condition of the engine is not in the prescribed state, and the timing control means being means for controlling either the advance angle fixing means or the retard angle fixing means based on the setting made by the timing setting means to fix the close timing so as to fix the valve closing times at the prescribed angle.

This aspect of the valve timing regulation system can further comprise:

a motor for rotating the crankshaft, in which case the timing control means includes:

advance control means for, when the timing setting means has set the intake valve close timing to advance the intake valve closing times by a prescribed angle, operating the motor to rotate the crankshaft backward by a prescribed angle to cause the advance angle fixing means to fix the valve closing times at the prescribed advance angle, and retard control means for, when the timing setting means has set the intake valve close timing to retard the intake valve closing times by a prescribed angle, operating the motor to rotate the crankshaft forward by a prescribed angle to cause the advance angle fixing means to fix the valve closing times at the prescribed retard angle.

With this configuration, even if the pump for producing oil pressure is driven by power taken from the engine, the intake valve close timing can be regulated by rotating the crankshaft forward or backward by a prescribed angle according to the condition of the engine.

In this valve timing regulation system, the timing changing means can be equipped with a retard chamber that has an in/out valve for entry/exit of a pressurized fluid and retards the phase relative to the rotation angle of the crankshaft in response to inflow of pressurized fluid, and valve opening control means can be provided for controlling the timing changing means to open the in/out valve when the crankshaft is rotated backward. With this configuration, since the pressurized fluid is caused to flow into the retard chamber by opening the valve, the phase relative to the rotation angle of the crankshaft can be easily retarded.

The second system for regulating the valve timing of an internal combustion engine according to the invention is a valve timing regulation system for regulating at least the close timing of intake valves for opening/closing intake ports of the internal combustion engine, the system comprising:

intake valves operating in response to a rotation angle of a crankshaft for closing the intake ports when the rotation angle of the crankshaft is in a prescribed range, timing changing means for changing the intake valve close timing by changing a response relationship of the intake valves with respect to the rotation angle of the crankshaft, condition predicting means responsive to an engine stop request for predicting based on the engine stop request the state of a condition affecting engine starting difficulty at the next engine starting, timing setting means for setting the intake valve close timing at the next engine starting based on the state of the engine condition predicted by the condition predicting means, and timing control means for controlling the timing changing means when the engine is stopped to cause the intake valves to be in a closed state at times defined by the set intake valve close timing.

In this second system for regulating the valve timing of an internal combustion engine according to the invention, the condition predicting means responds to an engine stop request by predicting based on the engine stop request the state of a condition of the engine at the next engine starting and the timing setting means sets the intake valve close timing at the next engine starting based on the predicted state of the condition. The timing control means controls the intake valve close timing by changing the response relationship of the intake valves with respect to the rotation angle of the crankshaft so that the engine stops at the set close timing.

The "condition affecting engine starting difficulty" whose state is predicted encompasses the state of engine warmup and the like and, for example, includes temperature and/or time passed since the engine was stopped. Conceivable configurations therefore include, for example, one in which the condition predicting means is engine temperature detection means and the intake valve close timing at the next starting is set based on whether or not the predicted engine temperature is lower than a prescribed temperature. Otherwise, a configuration can be adopted wherein the condition predicting means is means for predicting time to pass between engine stopping and the next engine starting and the intake valve close timing at the next starting is set based on whether or not the predicted time to pass is longer than a prescribed time.

Since the second system for regulating the valve timing of an internal combustion engine according to the invention sets the intake valve close timing at the next engine starting based on the predicted state of the condition of the engine and the engine is stopped at this close timing, the intake valve close timing at the next engine starting can be set with higher accuracy. Therefore, engine starting difficulty owing to insufficient compression pressure at engine starting, strong vibration of the engine upon starting owing to excessive compression pressure, and other such problems can be avoided.

In the second system for regulating the valve timing of an internal combustion engine according to the invention, the timing setting means can be means for setting the intake valve close timing to advance the intake valve closing times by a prescribed angle when the condition of the engine predicted by the condition detecting means is in a prescribed state. In this aspect of the valve timing regulation system, the timing changing means can be an advance angle fixing means for fixing the response relationship of the intake valves with respect to the rotation angle of the crankshaft so that the intake valve close timing advances the intake valve closing times by the prescribed angle and the timing control means can be means for controlling the advance angle fixing means based on the setting made by the timing setting means.

In the second system for regulating the valve timing of an internal combustion engine according to the invention, including the foregoing modified configurations, the timing setting means can be means for setting the intake valve close timing to retard the intake valve closing times by a prescribed angle when the condition of the engine predicted by the condition predicting means is in a prescribed state making the engine easy to start. In this aspect of the valve timing regulation system, the timing changing means can be retard angle fixing means for fixing the response relationship of the intake valves with respect to the rotation angle of the crankshaft so that the intake valve close timing retards the intake valve closing times by the prescribed angle and the timing control means can be means for controlling the retard angle fixing means based on the setting made by the timing setting means.

A valve timing regulation method according to the invention is a valve timing regulation method for regulating at least the close timing of intake valves for opening/closing intake ports of an internal combustion engine, the method comprising the steps of:

providing the engine with intake valves operating in response to a rotation angle of a crankshaft for closing the intake ports when the rotation angle of the crankshaft is in a prescribed range, detecting the state of a condition affecting engine starting difficulty, receiving an engine start request, responding to the engine start request by setting the intake valve close timing based on the state of the engine condition detected by the condition detecting means, and changing the intake valve close timing to the set close timing by changing a response relationship of the intake valves with respect to the rotation angle of the crankshaft.

Since this regulation method detects the state of a condition affecting engine starting difficulty and changes the intake valve close timing to the set close timing based on the detected state, it eliminates problems at the time of engine starting.

DESCRIPTION OF THE PREFERRED EMBODIMENTS

The implementation of the invention will now be explained with reference to embodiments.

Figure 5:
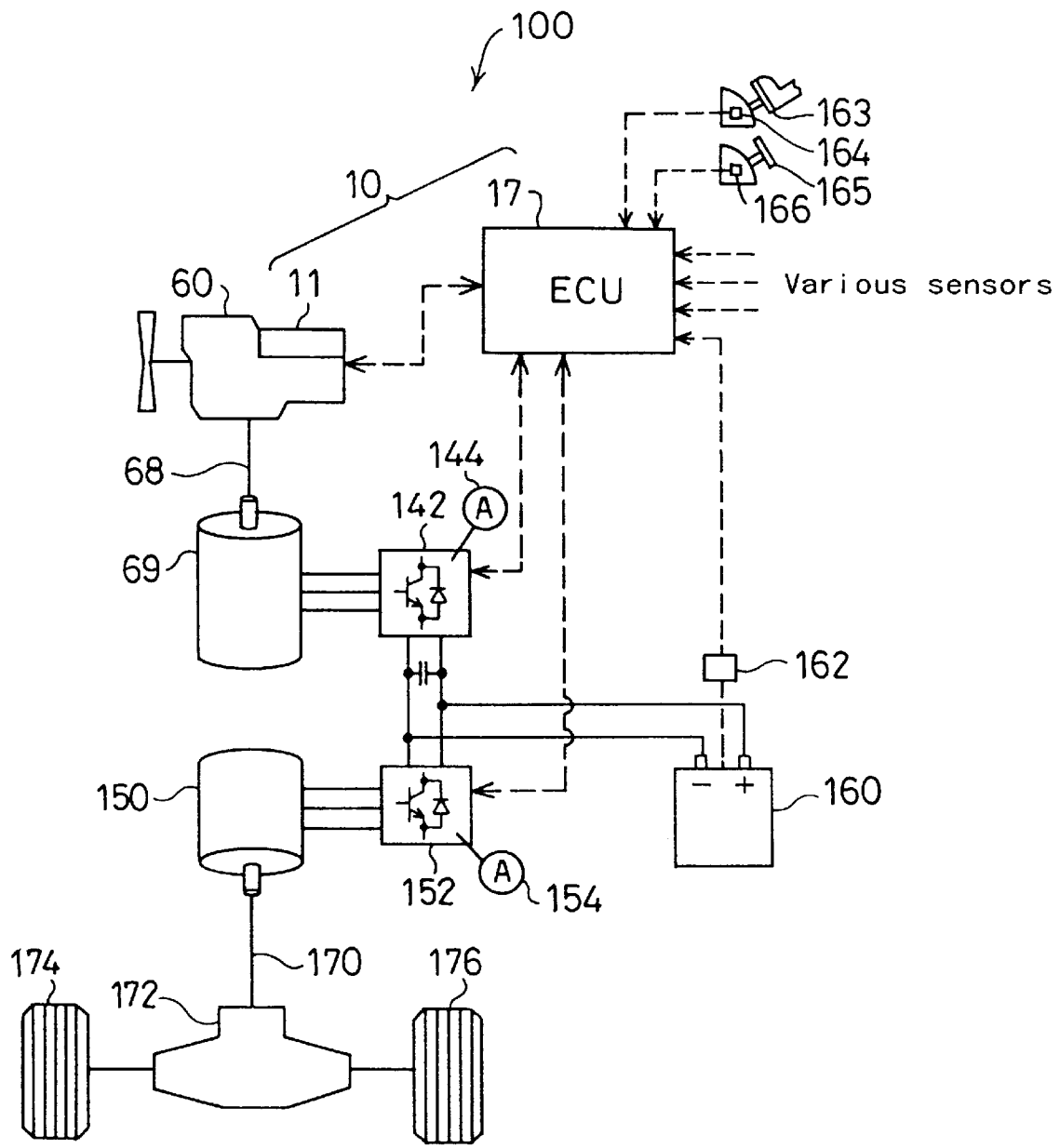
FIG. 5 is a schematic structural view of a vehicle 100 equipped with an engine 60 whose intake valve timing is regulated by the valve timing regulation system 10 according to the embodiment.

The configuration of a vehicle 100 will be briefly explained first with reference to FIG. 5. As illustrated, the vehicle 100 is a hybrid electric vehicle equipped with an engine 60, a generator-motor 69 that can generate electric power when driven by the output of the engine 60 and can be driven as a self-starting motor when starting the engine 60, a drive motor 150 for driving a drive shaft 170 connected to drive wheels 174, 176 through a differential gear 172, a generator-motor drive circuit 142 for driving the generator-motor 69, a drive motor drive circuit 152 for driving the drive motor 150, a battery 160 for supplying/receiving electric power to/from the generator-motor 69 through the generator-motor drive circuit 142 and supplying/receiving electric power to/from the drive motor 150 through the drive motor drive circuit 152, and an electronic control unit (ECU) 17 for controlling the engine 60 and the driving of the motors 69 and 150 and controlling a valve timing regulation system 10. The valve timing regulation system 10 according to this embodiment is constituted of a phase-changing mechanism 11 (explained later) built into the engine 60, the ECU 17 and other components.

Figure 1:
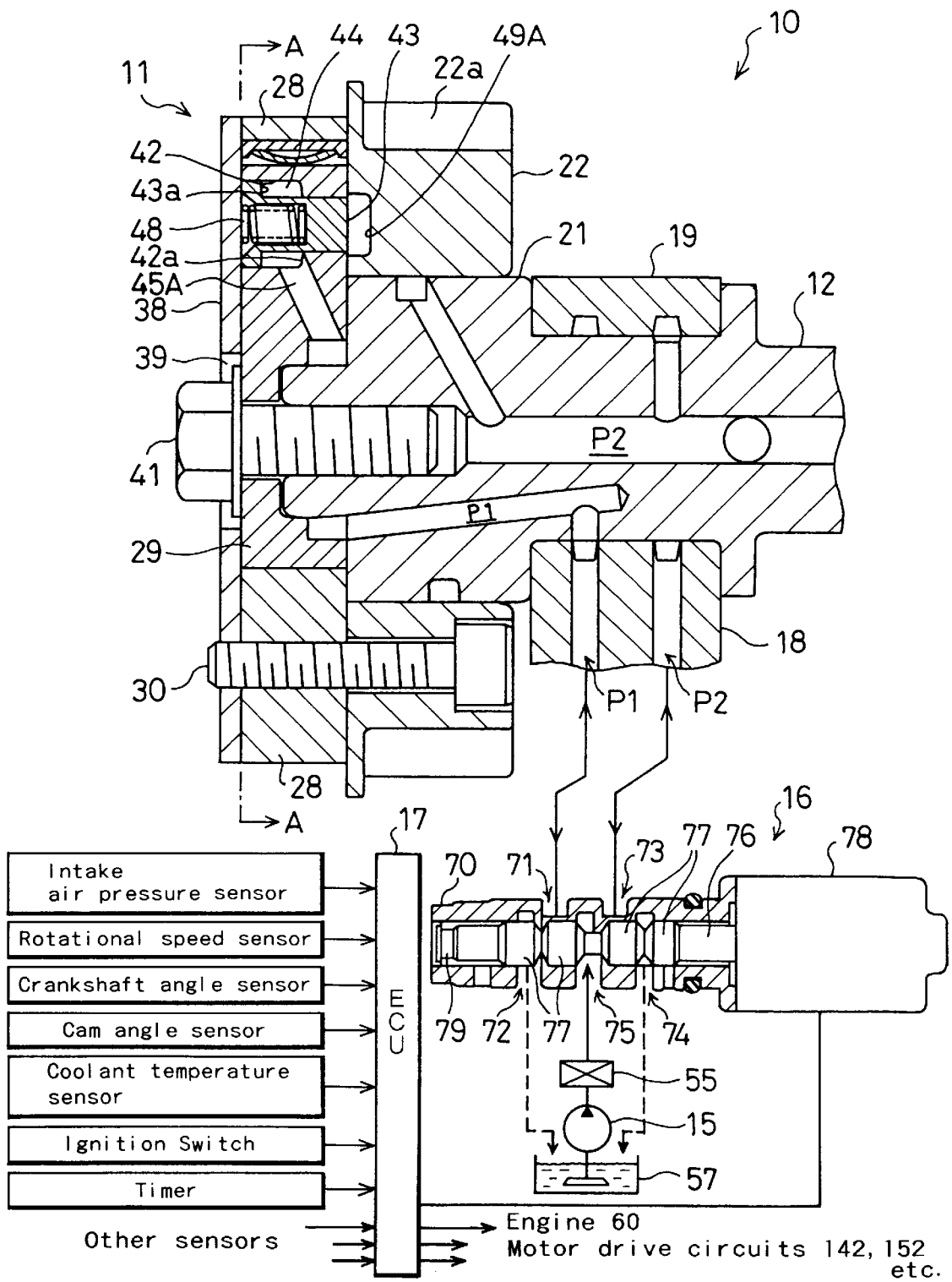
FIG. 1 is a structural view showing the general configuration of a valve timing regulation system 10 that is an embodiment of the invention.

The ECU 17 is a microcomputer having a CPU (not shown) as its core component and further includes a ROM storing a control program, a RAM used as working memory, input/output ports, and the like. As shown in FIGS. 1 and 5, various sensors indicating the operating condition of the engine 60 and the operating condition and the like of the generator-motor 69 and the drive motor 150, as well as sensors required for operating these components, are connected to the input ports of the ECU 17. Sensors usable for detecting the operating condition of the engine 60 include, for example, an intake air pressure sensor 80 for detecting the load of the engine 60, a rotational speed sensor 81 and a crankshaft angle sensor 82 provided in a distributor (not shown) for detecting the rotational speed and rotation angle of a crankshaft 68 (FIG. 4), a cam angle sensor 83 for detecting the rotation angle of an intake-side camshaft 12 explained later, a coolant temperature sensor 84 for detecting the coolant temperature of the engine 60, and the like. Sensors usable for detecting the operating condition of the generator-motor 69 and the drive motor 150 include an ammeter 144 for detecting three-phase current flowing through the generator-motor 69 via the generator-motor drive circuit 142, an ammeter 154 for detecting three-phase current flowing through the drive motor 150 via the drive motor drive circuit 152, and the like. The ECU 17 additionally has connected thereto, for example, an ignition switch 85 that detects the condition of an ignition key, a timer 86 for clocking elapsed time, an accelerator pedal position sensor 164 for detecting amount of depression of an accelerator pedal 163, a brake pedal position sensor 166 for detecting amount of depression of a brake pedal 165, a remaining capacity meter 162 for detecting the remaining capacity BRM of the battery 160, a throttle valve position sensor (not shown) for detecting the degree of throttle valve opening (position), and other sensors, switches and the like that are omitted from the drawings. The generator-motor drive circuit 142, the drive motor drive circuit 152, unshown members including igniters, fuel injection valves and a throttle valve actuator, a solenoid 78 of an oil control valve 16 described later, and the like are connected to the output ports of the ECU 17.

In the so-configured vehicle 100, the ECU 17 controls the drive motor drive circuit 152 to cause the drive motor 150 to output torque proportional the amounts of depression of the accelerator pedal 163 and the brake pedal 165 detected by the accelerator pedal position sensor 164 and the brake pedal position sensor 166 and controls the engine 60 to operate intermittently to keep the remaining capacity BRM of the battery 160 detected by the remaining capacity meter 162 within a prescribed range.

The valve timing regulation system 10 built into the vehicle 100 as an embodiment of the invention will be explained next. As shown in FIG. 1, the valve timing regulation system 10 includes the phase-changing mechanism 11 attached to the intake-side camshaft 12, an oil pump 15 driven by power from the engine 60 to deliver pressurized oil to the phase-changing mechanism 11, the oil control valve 16 for changing the path of the pressurized oil delivered by the oil pump 15, and the ECU 17.

Figure 4:
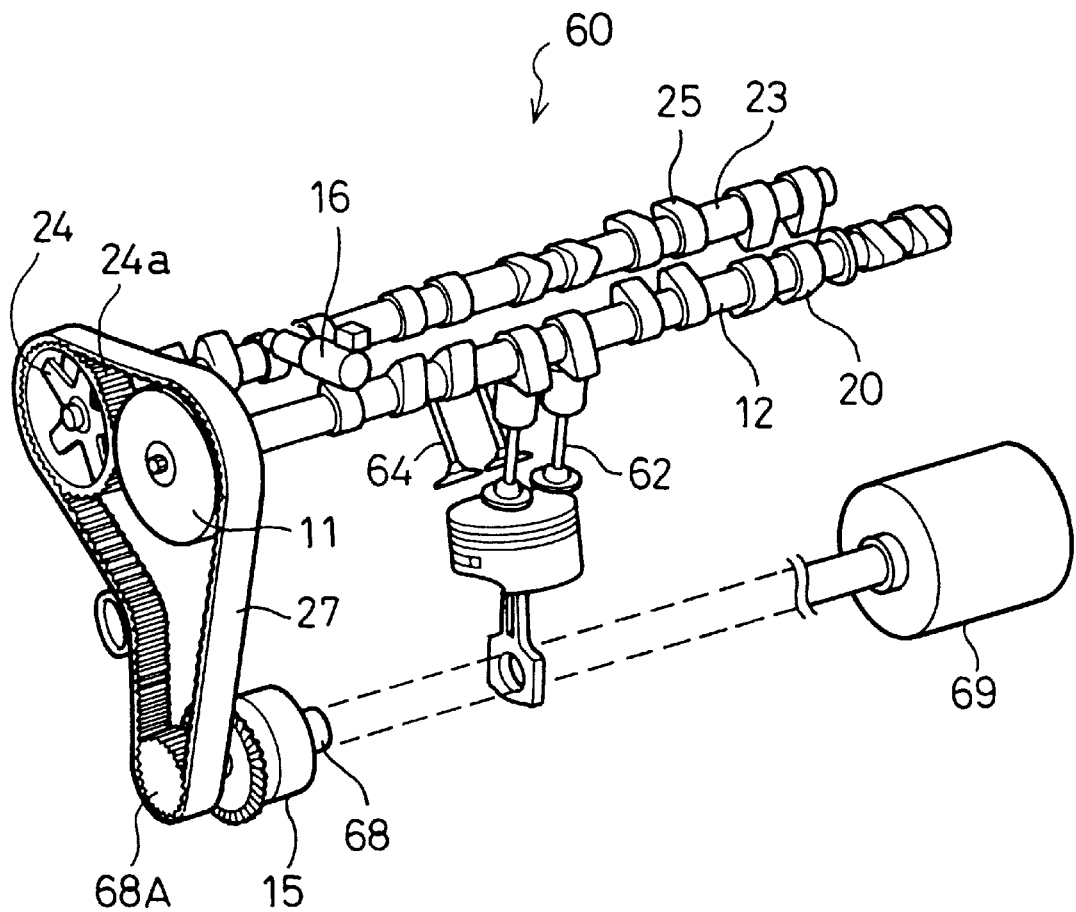
FIG. 4 is a structural view showing an example configuration of an intake-side camshaft 12 and an exhaust-side camshaft 23.

The intake-side camshaft 12 is rotatably supported by the upper surface of the cylinder head 18 of the engine 60 and a bearing cap 19. As shown in FIG. 4, the portion of the intake-side camshaft 12 extending off the right side of FIG. 1 is formed on its outer periphery with four pairs of cams 20. Each cylinder of the engine 60 is provided with two intake valves 62 and the upper end portion of each intake valve 62 makes contact with one of the cams 20. The intake valves 62 are opened and closed by rotation of the cams 20 together with the intake-side camshaft 12.

The portion of the intake-side camshaft 12 outward of the portion supported by the cylinder head 18 and the bearing cap 19 (the portion on the left side in FIG. 1) is formed as a large-diameter portion 21. An annular driven gear 22 is rotatably fitted on the outer periphery of the large-diameter portion 21. The outer periphery of the driven gear 22 is formed with multiple external teeth 22a that, as shown in FIG. 4, engage with external teeth 24a of a drive gear 24 attached to an exhaust-side camshaft 23. The gear ratio between the driven gear 22 and the exhaust-side camshaft 23 is 1:1. The exhaust-side camshaft 23 resembles the intake-side camshaft 12. Specifically, it is formed on its outer periphery with four pairs of cams 25. Each cylinder of the engine 60 is provided with two exhaust valves 64 and the upper end portion of each exhaust valve 64 makes contact with one of the cams 25. The exhaust valves 64 are opened and closed by rotation of the cams 25 together with the exhaust-side camshaft 23.

As shown in FIG. 4, a timing belt 27 is wound about the so-meshed driven gear 22 and drive gear 24 and a crank pulley 68A attached to the end of the crankshaft 68. Since the gear ratio between the crank pulley 68A and the driven and drive gears 22, 24 is 1:2, the driven gear 22 and the drive gear 24 make one revolution per two revolutions of the crankshaft 68.

Figure 2:
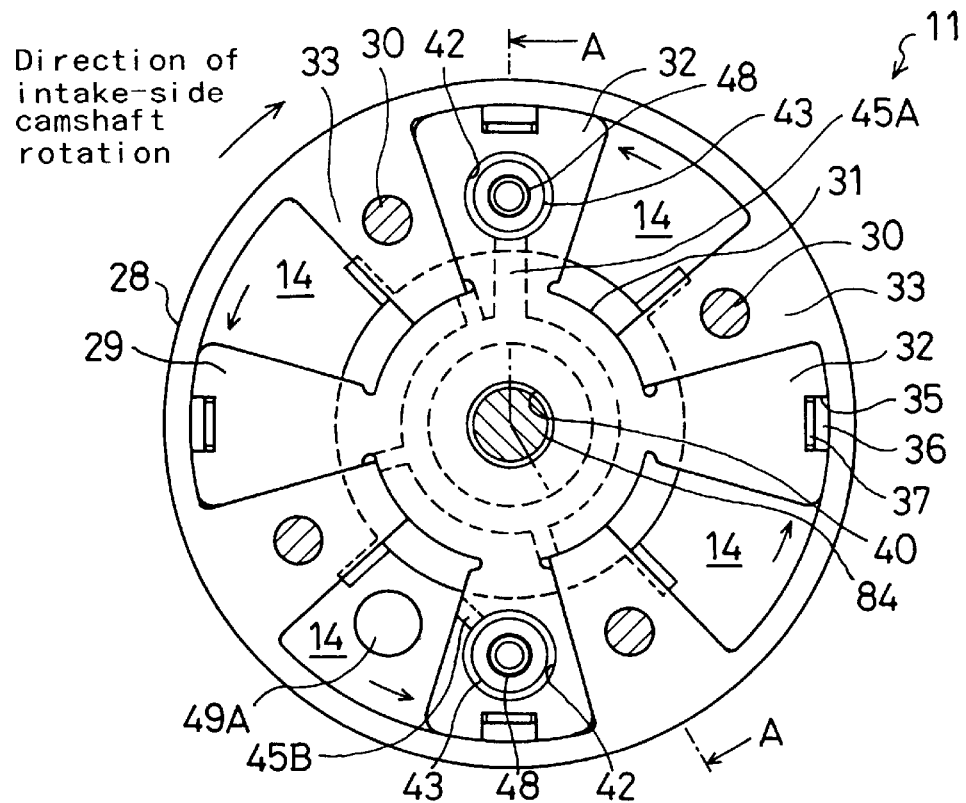
FIG. 2 is a sectional view of the valve timing regulation system 10 taken along line 23—23 in FIG. 1.
Figure 3:
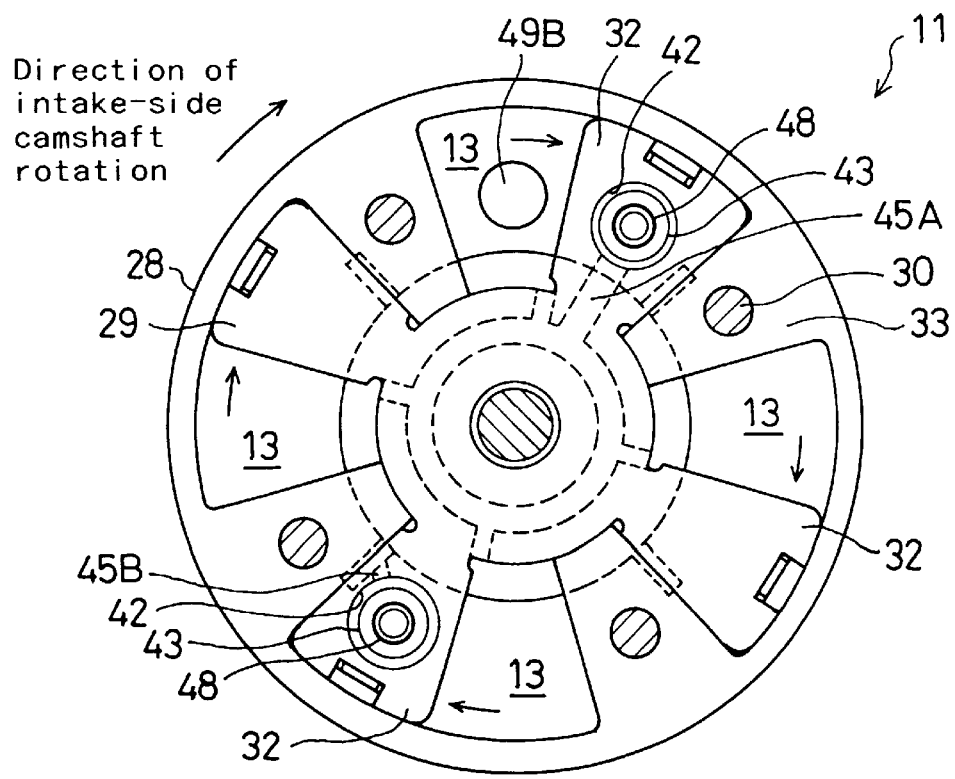
FIG. 3 is a sectional view of the valve timing regulation system 10 taken along line 23—23 in FIG. 1.

As shown in FIGS. 1 to 3, the phase-changing mechanism 11 comprises a generally hollow disk-shaped housing 28 and a vane 29 rotatably fitted in the housing 28. The housing 28 is fixed to the driven gear 22 together with a cover 38 covering the vane 29 by bolts 30 so that the housing 28 and the cover 38 rotate integrally with the driven gear 22. The interior of the housing 28 is formed at regularly spaced positions with four projecting portions 33 projecting toward the axis of the intake-side camshaft 12. These four projecting portions 33 and four pressure-receiving portion 32 formed on a fastening portion 31 of the vane 29 in generally cross-like configuration form four advance oil pressure chambers 13 and four retard oil pressure chambers 14. The advance oil pressure chambers 13 and the retard oil pressure chambers 14 are sealed by disposing seal members 36 in peripheral notches 35 formed in the outer peripheral portion of the pressure-receiving portions 32 so as to be biased toward the outer peripheral surface by plate springs 37. The vane 29 is fixed to the intake-side camshaft 12 by a fastening bolt 41 inserted through a center hole 40 formed at the center of the fastening portion 31 and is engaged with the intake-side camshaft 12 by knock pins (not shown) so as to rotate integrally with the intake-side camshaft 12.

Since the vane 29 is rotatably accommodated in the housing 28, it can be rotated relative to the housing 28 from the state shown in the sectional view of FIG. 3 to the state shown in the sectional view of FIG. 4. It thus has a rotation phase of this rotation angle with respect to the housing 28. Since the housing 28 rotates synchronously with the crankshaft 68, this rotation phase can also be viewed as being with respect to the crankshaft 68. The rotation phase of the intake-side camshaft 12 with respect to the crankshaft 68 can therefore be changed by regulating the position of the vane 29 with respect to the housing 28, i.e., by regulating the size of the advance oil pressure chambers 13 and the retard oil pressure chambers 14. This rotation phase change can be effected by supplying oil from the oil control valve 16 through an advance-side oil line P1 and a retard-side oil line P2 communicating with the advance oil pressure chambers 13 and the retard oil pressure chambers 14.

Figure 6:
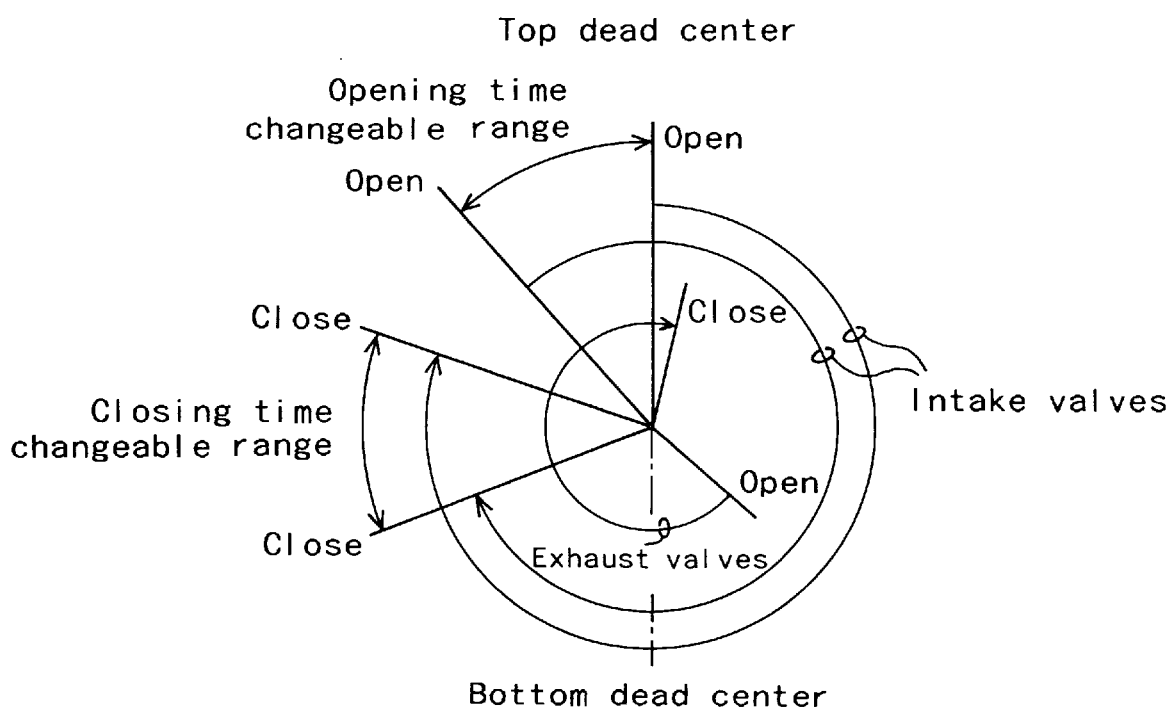
FIG. 6 is a valve-timing diagram showing an example of the open/close timing of intake valves 62 and exhaust valves 64.

As shown by way of example In the valve-timing diagram of FIG. 6, in this embodiment the timing with respect to the cam 20 is set so as to enable the closing time of the intake valves 62 to be regulated within a range straddling an angular position retarded from bottom dead center of the crankshaft 68 by about 90 degrees. The closing time of the intake valves 62 is retarded from the bottom dead center of the crankshaft 68 by such a large angle because the valve timing regulation system 10 is incorporated into a series hybrid electric vehicle that enables steady-state operation of the engine 60 at an efficient operation point in terms of output torque and engine speed. When the closing time of the intake valves 62 is retarded in this way, the intake valves 62 remain open even after the compression stroke starts and, therefore, part of the air-fuel mixture drawn into the combustion chambers of the engine 60 is discharged to the intake manifold side. The actual compression stroke can therefore be shortened. In this type of operation in which the compression stroke is shorter than the expansion stroke, known as the Atkinson cycle, the compression pressure is low. This makes it possible to realize an engine 60 with low knocking and vibration. Moreover, the fuel efficiency of the engine 60 is enhanced owing to the high cycle efficiency.

Of the four pressure-receiving portions 32 of the vane 29, two diametrically opposed ones are formed in directions parallel to the axis of the intake-side camshaft 12 with through-holes 42 having step portions 42a. Lock pins 43 in the shape of cylinders closed at one end are inserted into the through-holes 42. Springs 48 are fitted into the lock pins 43 so that the lock pins 43 are biased toward the driven gear 22. The contact surface of the driven gear 22 with the vane 29 in FIG. 3 is formed at a location opposite the lock pin 43 positioned at the bottom portion of FIG. 3 (approximately at the center of the retard oil pressure chamber 14 formed at the lower portion of FIG. 2) with an advance-side engagement hole 49A that can be entered by the lock pin 43. Entry of the lock pin 43 into the advance-side engagement hole 49A fixes the rotation phase of the vane 29 at the most advanced position. Similarly, the contact surface of the driven gear 22 with the vane 29 in FIG. 2 is formed at a location opposite the lock pin 43 positioned at the top portion of FIG. 2 (approximately at the center of the advance oil pressure chamber 13 formed at the upper portion of FIG. 3) with a retard-side engagement hole 49B that can be entered by the lock pin 43. Entry of the lock pin 43 into the retard-side engagement hole 49B fixes the rotation phase of the vane 29 at the most retarded position. As mentioned earlier, the lock pins 43 are biased toward the driven gear 22 by the springs 48. When the vane 29 is rotated to align the associated lock pin 43 with the advance-side engagement hole 49A or the retard-side engagement hole 49B, therefore, the lock pin 43 passes into the advance-side engagement hole 49A or the retard-side engagement hole 49B. This enables the rotation phase of the vane 29 to be fixed at either the most advanced position or the most retarded position.

The tips of the lock pins 43 are formed with large-diameter portions 43a and an annular oil-pressure chamber 44 is formed between each lock pin 43 and through-hole 42. The oil-pressure chamber 44 formed by the lock pin 43 located at the upper portion of FIG. 2 is communicated with the advance-side oil line P1 by a connecting passage 45A. Therefore, when the lock pin 43 located at the upper portion of FIG. 2 is present in the retard-side engagement hole 49B (when the vane 29 is fixed at the most retarded position), if oil is supplied through the advance-side oil line P1 to the oil-pressure chamber 44 formed by the lock pin 43, the pressure of the oil will act on the large-diameter portion 43a of the lock pin 43 to extract the lock pin 43 from the retard-side engagement hole 49B and enable the vane 29 to rotate in the advance direction. On the other hand, the oil-pressure chamber 44 formed by the lock pin 43 located at the lower portion of FIG. 2 is communicated with the retard-side oil line P2 by a connecting passage 45B. Therefore, when the lock pin 43 located at the lower portion of FIG. 2 is present in the advance-side engagement hole 49A (when the vane 29 is fixed at the most advanced position), if oil is supplied through the retard-side oil line P2 to the oil-pressure chamber 44 formed by the lock pin 43, the lock pin 43 will be extracted from the advance-side engagement hole 49A to enable the vane 29 to rotate in the retard direction.

As shown in FIG. 1, the oil pump 15 is driven by power from the engine 60 to pump oil from an oil pan 57 and deliver it to the oil control valve 16 under pressure. An oil filter 55 is provided in the line between the oil pump 15 and the oil control valve 16 for removing foreign matter from the oil.

As shown in FIG. 1, the oil control valve 16 comprises a casing 70, a spool 76 accommodated in the casing 70, a solenoid 78 for axially driving the spool 76, and a spring 79 for biasing the spool 76 toward the solenoid 78. The casing 70 is formed with an advance-side port 71 connected to the advance-side oil line P1, an advance-side drain port 72 for discharging oil flowing in from the advance-side oil line P1 to the oil pan 57, a retard-side port 73 connected to the retard-side oil line P2, a retard-side drain port 74 for discharging oil flowing in from the retard-side oil line P2 to the oil pan 57, and an inlet port 75 serving as an inlet for pressurized oil delivered from the oil pump 15 through the oil filter 55.

The spool 76 is formed with two inner valve bodies 77 at positions where they can simultaneously close the advance-side port 71 and the retard-side port 73 and with two outer valve bodies 77 for opening the advance-side drain port 72 and the retard-side drain port 74. Therefore, when the spool 76 is moved rightward in the drawing as shown in FIG. 1, the inlet port 75 communicates with the retard-side port 73 and the advance-side port 71 communicates with the advance-side drain port 72, whereby oil is supplied through the retard-side oil line P2 to the retard oil pressure chambers 14 and oil is discharged from the advance oil pressure chambers 13 through the advance-side oil line P1. The vane 29 is thus rotated in the retard direction. Conversely, when the spool 76 is moved leftward in the drawing, the inlet port 75 communicates with the advance-side port 71 and the retard-side port 73 communicates with the retard-side drain port 74, whereby oil is supplied through the advance-side oil line P1 to the advance oil pressure chambers 13 and oil is discharged from the retard oil pressure chambers 14 through the retard-side oil line P2. The vane 29 is thus rotated in the advance direction. The spool 76 comes to rest at the position where the force of the solenoid 78 acting leftward in the drawing is in equilibrium with the force of the spring 79 acting rightward in the drawing. The position of the spool 76 can therefore be controlled by duty-controlling the voltage applied to the solenoid 78.

The control by the valve timing regulation system 10 according to this embodiment at stopping and starting of the engine 60 will now be explained based on the engine stop control routine illustrated in FIG. 7 and the engine start control routine illustrated in FIG. 8.

Figure 7:
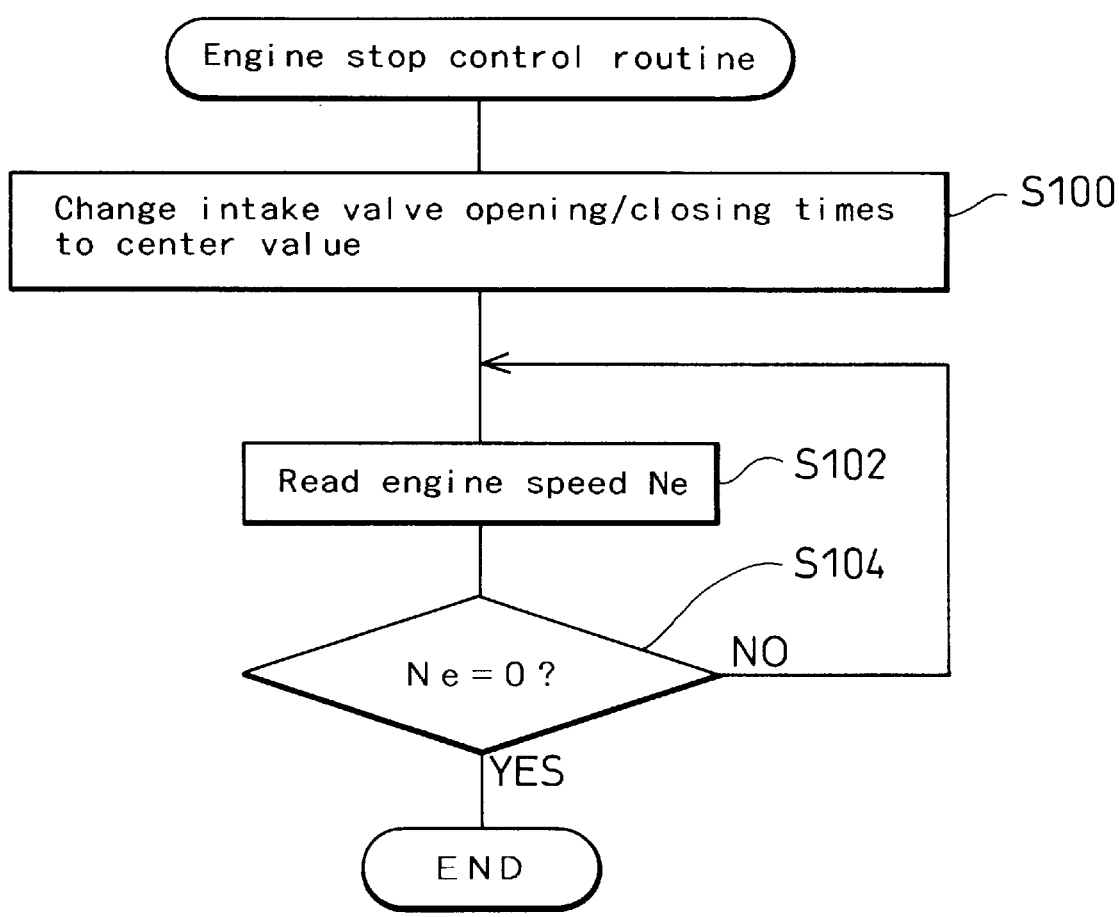
FIG. 7 is a flowchart showing an example of an engine stop control routine executed by an ECU 17.

The engine stop control routine of FIG. 7 is executed when the ECU 17 outputs a signal for stopping the operation of the engine 60 based on the detected remaining capacity BRM of the battery 160 and when the ignition switch 85 detects that the operator has turned the ignition key to the OFF position. When this routine is executed, the ECU 17 first changes the center value of the range within which the opening and closing times of the intake valves 62 can be changed (Step S100). Specifically, the ECU 17 first ascertains the rotation angle of the crankshaft 68 from the detection output of the crankshaft angle sensor 82 and ascertains the rotation angle and the rotation phase of the intake-side camshaft 12 from the detection output of the cam angle sensor 83. It then controls the oil control valve 16 so that this rotation phase becomes the center value of the range within which change is possible (the change-possible range).

Next, the ECU 17 reads the rotational speed of the crankshaft 68 detected by the rotational speed sensor 81, i.e., the speed Ne of the engine 60, (Step S102) and discriminates whether or not the engine 60 is stopped (Step S104). The routine waits for the engine 60 to stop before terminating.

By these steps the opening/closing time of the intake valves 62 can be set at the center of the change-possible range. Specifically, the vane 29 of the phase-changing mechanism 11 is set at a position where the volumes of the advance oil pressure chambers 13 and the retard oil pressure chambers 14 are approximately equal and the lock pins 43 are not engaged with the advance-side engagement hole 49A or the retard-side engagement hole 49B.

Figure 8:
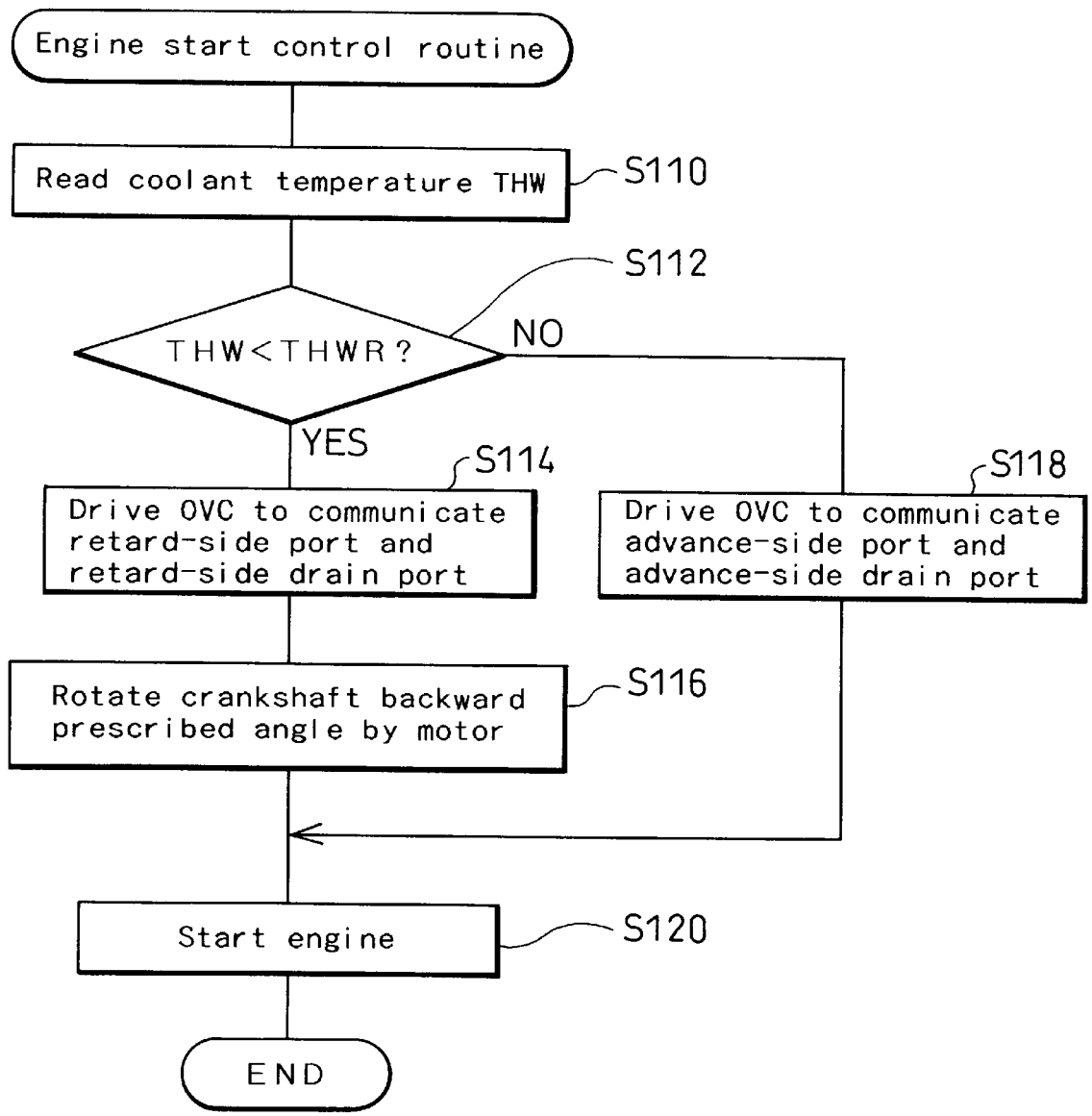
FIG. 8 is a flowchart showing an example of an engine start control routine executed by the ECU 17.

After the engine 60 has stopped with the open/close timing set in the foregoing manner, if the ECU 17 outputs a signal for starting the engine 60 based on the detected remaining capacity BRM of the battery 160 or if the ignition switch 85 detects that the operator has turned the ignition key to the ON position, the ECU 17 starts the engine 60 by executing the engine start control routine of FIG. 8. When this routine is executed, the ECU 17 first reads the coolant temperature THW of the engine 60 detected by the coolant temperature sensor 84 (Step S110) and compares the read coolant temperature THW with a threshold temperature THWR (Step S112). The threshold temperature THWR is a temperature value for discriminating whether the engine 60 is still warm or has already completely cooled down.

When the coolant temperature THW is lower than the threshold temperature THWR, it is judged that the engine 60 is cold, in which case the oil control valve (OVC) 16 is driven to communicate the retard-side port 73 and the retard-side drain port 74 (Step S114), the generator-motor 69 is used to rotate the crankshaft 68 backward by a prescribed angle (Step S116), and the engine 60 is started (Step S120). The crankshaft 68 is rotated backward before starting the engine 60 in order to move the vane 29 in the advance direction from its position at the center of the change-possible range by the action of the static friction of the intake-side camshaft 12, thereby inserting a lock pin 43 in the advance-side engagement hole 49A and fixing the open/close times of the intake valves 62 at the most advanced position. The purpose of driving the oil control valve 16 to communicate the retard-side port 73 and the retard-side drain port 74 before rotating the crankshaft 68 backward is to ensure that oil present in the retard oil pressure chambers 14 does not hinder movement of the vane 29. The open/close times of the intake valves 62 are advanced to the maximum when the engine 60 is started cold in light of the fact that the cold engine 60 is difficult to start unless high compression pressure is imparted to the air-fuel mixture. Specifically, starting difficulty owing to insufficient compression ratio is reduced by advancing the close time of the intake valves 62 toward the bottom dead center of the crankshaft 68 so as to lengthen the compression stroke and secure high compression pressure.

On the other hand, when the coolant temperature THW is equal to or higher than the threshold temperature THWR, it is judged that the engine 60 is warm, in which case the oil control valve (OVC) 16 is driven to communicate the advance-side port 71 and the advance-side drain port 72 (Step S118) and the engine 60 is started (Step S120). After the engine 60 starts, the vane 29 initially positioned at the center of the change-possible range moves in the retard direction owing to the action of the static friction of the intake-side camshaft 12, thereby inserting a lock pin 43 in the advance-side engagement hole 49B and fixing the open/close times of the intake valves 62 at the most retarded position. In this case, therefore, the engine 60 is started with the open/close times of the intake valves 62 at the most retarded position. The purpose of driving the oil control valve 16 to communicate the advance-side port 71 and the advance-side drain port 72 before starting the engine 60 is to ensure that oil present in the advance oil pressure chambers 13 does not hinder movement of the vane 29. The open/close times of the intake valves 62 are retarded to the maximum when the engine 60 is started warm in light of the fact that the warm engine 60 is easy to start even if high compression pressure is not imparted. Specifically, vibration at and immediately following starting is reduced by retarding the close time of the intake valves 62 away from the bottom dead center of the crankshaft 68 so as to shorten the compression stroke.

The valve timing regulation system 10 according to the embodiment explained in the foregoing enables the engine 60 to be started with the open/close timing of the intake valves 62 optimized for the temperature of the engine 60. Specifically, at the time of a cold start the open/closing times of the intake valves 62 are advanced to the maximum so as to increase the compression pressure of the air-fuel mixture in the compression stroke, thereby decreasing the starting difficulty of the engine 60, while at the time of a warm start the open/close times of the intake valves 62 are retarded to the maximum so as to lower the compression pressure of the air-fuel mixture in the compression stroke, thereby reducing vibration at and immediately after starting.

Although the valve timing regulation system 10 according to this embodiment stops the engine 60 with the open/close timing of the intake valves 62 set at the center of the change-possible range, the engine 60 can be stopped with the timing set at any desired position insofar as no lock pin 43 is inserted into either the advance-side engagement hole 49A or the retard-side engagement hole 49B.

Although the valve timing regulation system 10 according to this embodiment is provided with the retard-side engagement hole 49B and a lock pin 43 is inserted into the retard-side engagement hole 49B at the time of a warm start, the retard-side engagement hole 49B can be omitted. Omission of the retard-side engagement hole 49B is possible because at the time of a warm start the vane 29 is moved in the retard direction by static frictional force and/or dynamic frictional force of the intake-side camshaft 12 and comes to be located at the most retarded position when pressure-receiving portions 32 of the vane 29 come into contact with the projecting portions 33 of the housing 28.

While the valve timing regulation system 10 according to this embodiment facilitates drainage of oil from the retard oil pressure chambers 14 or the advance oil pressure chambers 13 by rotating the crankshaft 68 backward or driving the oil control valve 16 before starting the engine 60, driving of the oil control valve 16 is unnecessary in the case of a configuration wherein the oil present in the advance oil pressure chambers 13 and the retard oil pressure chambers 14 is drained after the engine 60 stops.

Although the valve timing regulation system 10 according to this embodiment uses power from the engine 60 to drive the oil pump 15 for supplying pressurized oil, an oil pump driven by electric power stored in the battery 160 can be used instead. In this case, the engine stop control routine of FIG. 7 need not be executed and, in the execution of the engine start control routine of FIG. 8, it suffices to replace Step S114 and Step S116 with a step for driving the oil control valve 16 to set the open/close times of the intake valves 62 at the most advanced position and to replace the Step S118 with a step for driving the oil control valve 16 to set the open/close times of the intake valves 62 at the most retarded position.

Although the valve timing regulation system 10 according to this embodiment is applied to a configuration for operating the engine 60 intermittently, it can instead be applied to a configuration that does operate the engine 60 intermittently.

A timing regulation system 10B that is a second embodiment of the invention will now be explained. The valve timing regulation system 10B according to the second embodiment has the same hardware configuration as the valve timing regulation system 10 according to the first embodiment. Hardware constituents of the valve timing regulation system 10B according to the second embodiment are therefore assigned the same reference symbols as the corresponding hardware constituents of the first embodiment and will not be explained again. The control by the valve timing regulation system 10B according to the second embodiment at stopping of the engine 60 will now be explained based on the engine stop control routine illustrated in FIG. 9.

Figure 9:
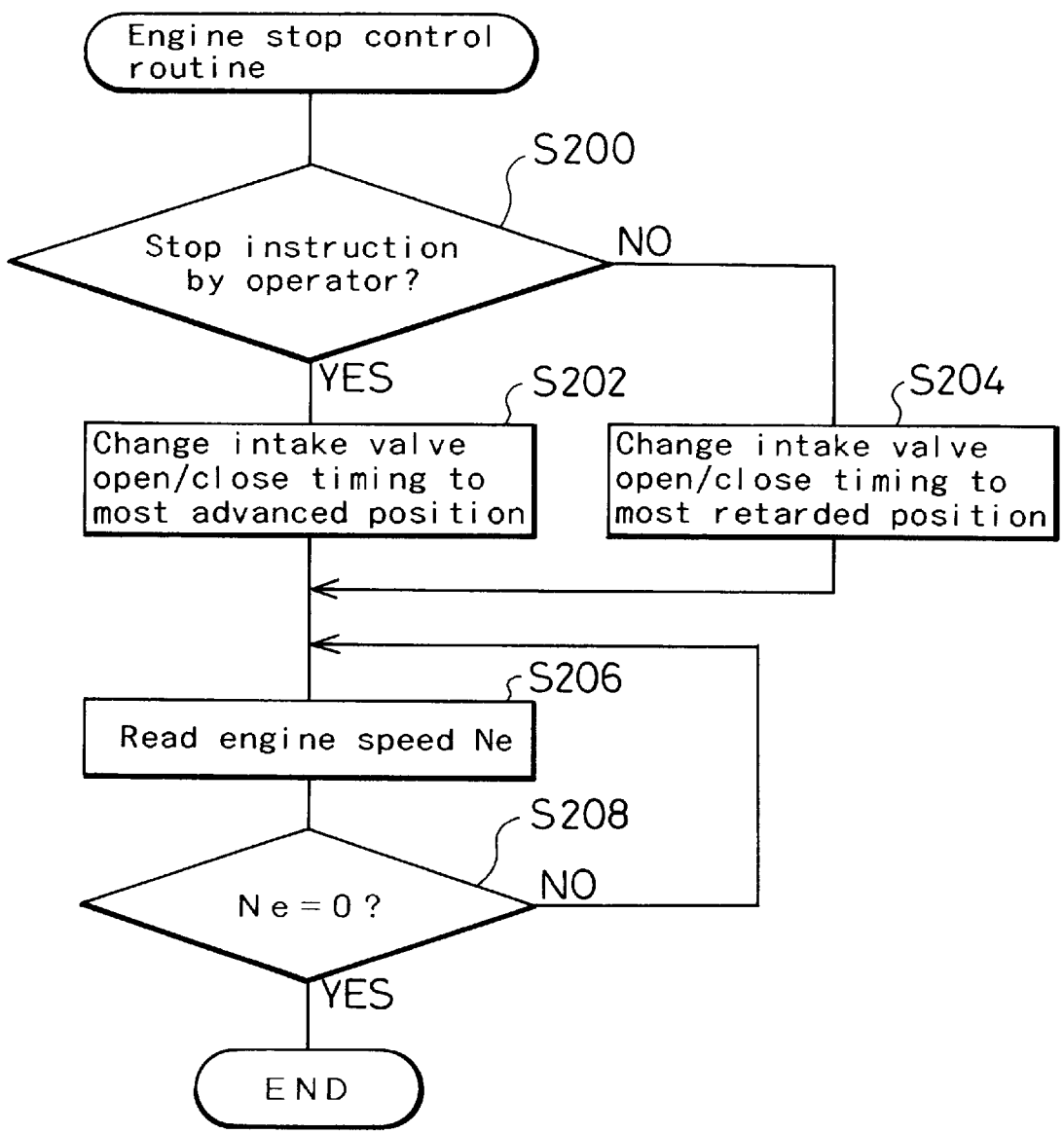
FIG. 9 is a flowchart showing an example of an engine stop control routine executed by the ECU 17 of a valve timing regulation system 10B according to a second embodiment.

Like the engine stop control routine of FIG. 7 executed by the valve timing regulation system 10 according to the first embodiment, the engine stop control routine of FIG. 9 is also executed when the ECU 17 outputs a signal for stopping the operation of the engine 60 based on the detected remaining capacity BRM of the battery 160 and when the ignition switch 85 detects that the operator has turned the ignition key to the OFF position. When this routine is executed, the ECU 17 first discriminates whether the instruction (signal) to stop the operation of the engine 60 is a signal output by the ECU 17 based on the remaining capacity BRM of the battery 160 or a signal output by the ignition switch 85 based on operation of the ignition key by the operator (Step S200).

When the stop signal is found to have been produced by the operator, this is judged to mean that the next engine starting is likely to be effected considerably later when the engine 60 is cold and the open/close timing of the intake valves 62 is therefore changed to the most advanced position (Step S202). When the stop signal is found to have been produced by the ECU 17, this is judged to mean that the engine 60 is likely to be started again while still warm and the open/close timing of the intake valves 62 is therefore changed to the most retarded position (Step S204). The routine waits for the engine 60 to stop before terminating (Steps S206 and S208). Since the hardware configuration of the valve timing regulation system 10B according to the second embodiment is the same as that of the valve timing regulation system 10 according to the first embodiment, changing the open/close times of the intake valves 62 to the most advanced position causes the vane 29 to be fixed at the most advanced position owing to insertion of a lock pin 43 in the advance-side engagement hole 49A, while changing the open/close times of the intake valves 62 to the most retarded position causes the vane 29 to be fixed at the most retarded position owing to insertion of a lock pin 43 in the retard-side engagement hole 49B. The next starting of the engine 60 is therefore effected with the open/close timing of the intake valves 62 fixed at the most advanced position or most retarded position.

The valve timing regulation system 10B according to the second embodiment explained in the foregoing predicts the temperature of the engine 60 at the next starting based on the type of signal for stopping the engine 60 and stops the operation of the engine 60 with the open/close timing of the intake valves 62 optimized for the predicted temperature. The starting of the engine can therefore be effected at appropriate open/close timing without regulating the open/close timing of the intake valves 62.

Figure 10:
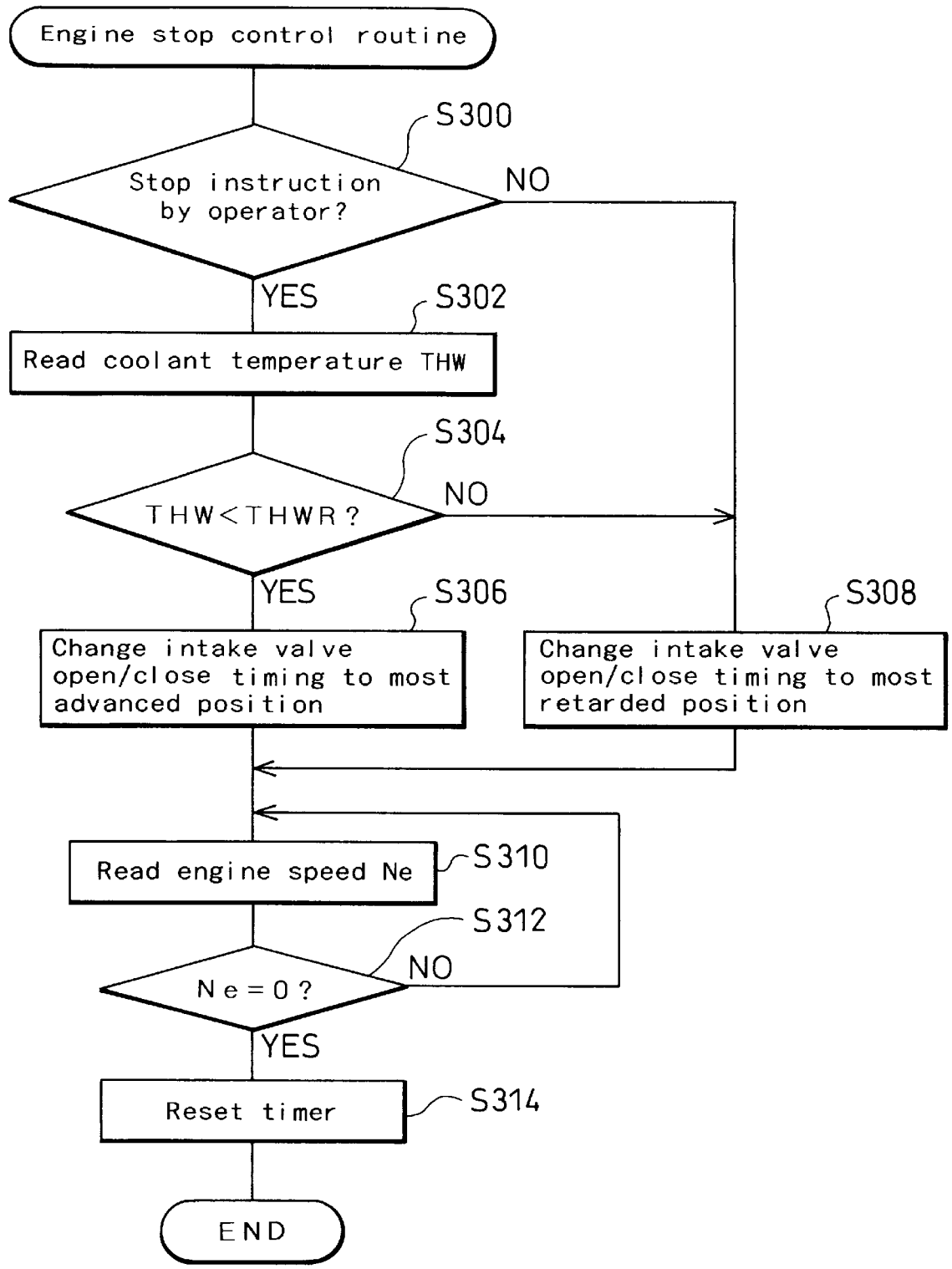
FIG. 10 is a flowchart showing an example of an engine stop control routine executed by the ECU 17 of a valve timing regulation system 10C according to a third embodiment.
Figure 11:
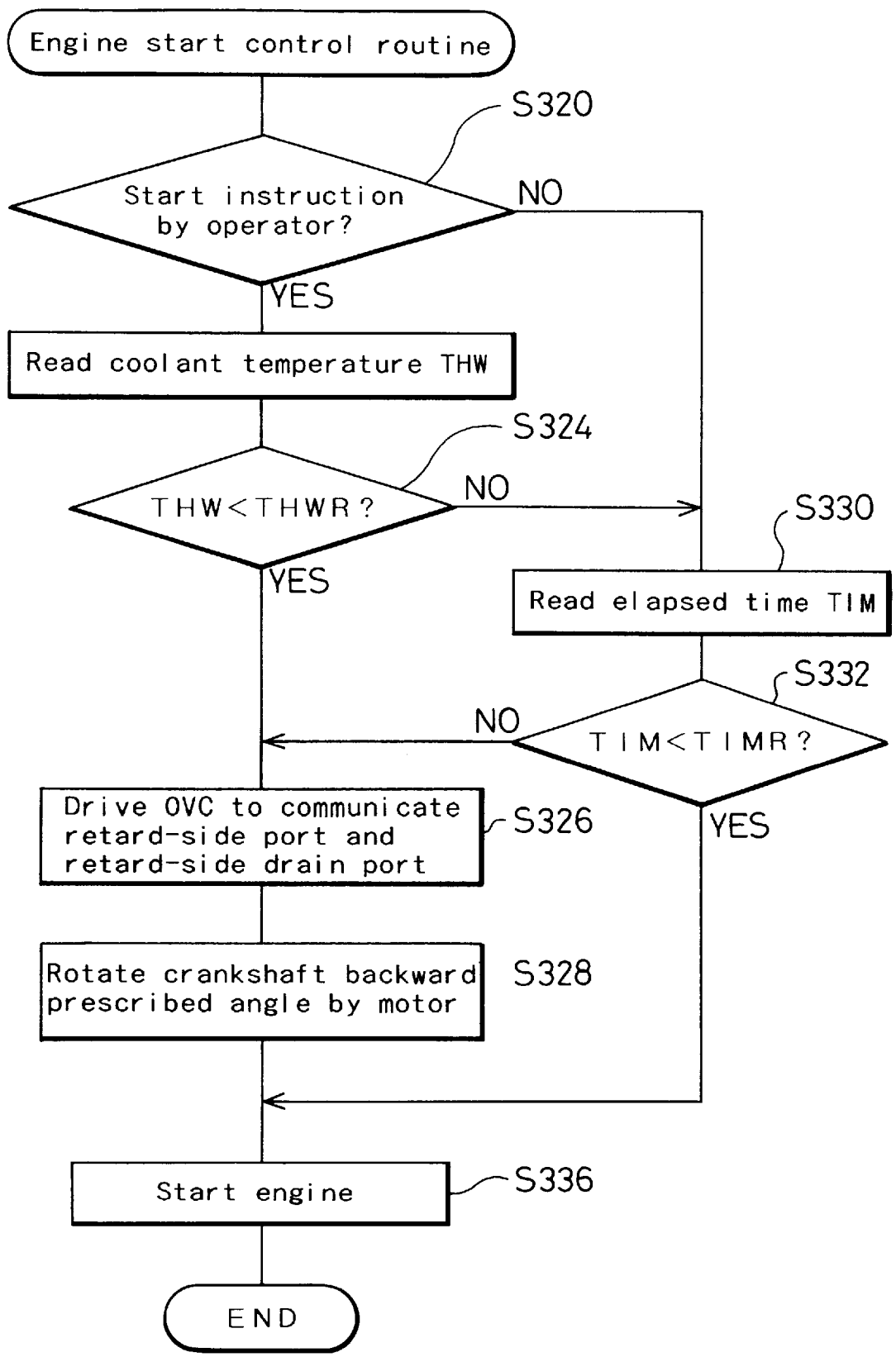
FIG. 11 is a flowchart showing an example of an engine start control routine executed by the ECU 17 of the valve timing regulation system 10C according to third embodiment.

A timing regulation system 10C that is a third embodiment of the invention will now be explained. The valve timing regulation system 10 according to the third embodiment has the same hardware configuration as the valve timing regulation system 10 according to the first embodiment except for not having the retard-side engagement hole 49B or the lock pin 43 for insertion in the retard-side engagement hole 49B. The constituents of the valve timing regulation system 10C according to the third embodiment are therefore assigned the same reference symbols as the corresponding constituents of the first embodiment and will not be explained again. The control by the valve timing regulation system 10C according to the third embodiment at stopping and starting of the engine 60 will now be explained based on the engine stop control routine illustrated in FIG. 10 and the engine start control routine illustrated in FIG. 11. Similarly to in the first and second embodiments, the engine stop control routine of FIG. 10 is executed when the ECU 17 outputs a signal for stopping the operation of the engine 60 based on the detected remaining capacity BRM of the battery 160 and when the ignition switch 85 detects that the operator has turned the ignition key to the OFF position. Similarly to the first embodiment, the engine start control routine of FIG. 11 is executed when the ECU 17 outputs a signal for starting the engine 60 based on the detected remaining capacity BRM of the battery 160 and when the ignition switch 85 detects that the operator has turned the ignition key to the ON position. The processing effected at stopping of the engine 60 will be explained first based on the engine stop control routine of FIG. 10.

When the engine stop control routine of FIG. 10 is executed, the ECU 17, as in Step S200 of the engine stop control routine of the second embodiment shown in FIG. 9, first discriminates whether the instruction (signal) to stop the operation of the engine 60 came from the ECU 17 or the operator (Step S300). When the stop signal is found to have come from the operator, the ECU 17 reads the coolant temperature THW of the engine 60 detected by the coolant temperature sensor 84 (Step S302) and compares the read coolant temperature THW with a threshold temperature THWR (Step S304). The threshold temperature THWR is the same as that used in the first embodiment. When the coolant temperature THW is lower than the threshold temperature THWR, it is judged that the next starting of the engine 60 will be a cold start and the open/close times of the intake valves 62 are changed to the most advanced position (Step S306), whereafter the routine waits for the engine 60 to stop (Steps S310 and S312), resets the timer 86 (Step S314), and terminates. Changing the open/close times of the intake valves 62 to the most advanced position causes the open/close times of the intake valves 62 to be fixed at the most advanced position owing to insertion of the lock pin 43 in the advance-side engagement hole 49A.

On the other hand, when Step S300 finds the signal for stopping the engine 60 came from the ECU 17 or when Step S304 finds the coolant temperature THW to be equal to or higher than the threshold temperature THWR, this is judged to mean that the engine 60 is likely to be started again while still warm and the open/close timing of the intake valves 62 is therefore changed to the most retarded position (Step S308), whereafter the routine waits for the engine 60 to stop (Steps S310 and S312), resets the timer 86 (Step S314), and terminates. Since the valve timing regulation system 10C according to the third embodiment is not provided with the retard-side engagement hole 49B or a lock pin 43 for insertion therein, the open/close timing of the intake valves 62 is not fixed at the most advanced position even if the open/close timing of the intake valves 62 is once changed to the most advanced position.

After the engine 60 has stopped in the foregoing manner, if the ECU 17 outputs a signal for starting the engine 60 based on the detected remaining capacity BRM of the battery 160 or if the ignition switch 85 detects that the operator has turned the ignition key to the ON position, the ECU 17 starts the engine 60 by executing the engine start control routine of FIG. 11. When this routine is executed, the ECU 17, as in engine stop control, first discriminates whether the instruction (signal) to start the engine 60 came from the ECU 17 or the operator (Step S320). When the start signal is found to have come from the operator, the ECU 17 reads the coolant temperature THW of the engine 60 (Step S322) and compares the read coolant temperature THW with a threshold temperature THWR (Step S324). When the coolant temperature THW is lower than the threshold temperature THWR, the ECU 17 judges that a cold start is being effected. It then drives the oil control valve 16 to communicate the retard-side port 73 and the retard-side drain port 74 (Step S326), causes the generator-motor 69 to rotate the crankshaft 68 backward by a prescribed angle (Step S328), and starts the engine 60 (Step S336). Note that open/close timing of the intake valves 62 was earlier set to either the most advanced position or the most retard position by the engine stop control routine of FIG. 10. If it was set to the most advanced position, the engine 60 is started after the crankshaft 68 has been rotated with the open/close timing fixed in this position. If it was set to the most retarded position, the engine 60 is started after the open/close timing has been fixed at the most advanced position by the backward rotation of the crankshaft 68. Irrespective of the set position of the open/close timing of the intake valves 62, therefore, the engine 60 is started with the open/close timing fixed at the most advance position.

When Step S320 finds that the start signal came from the operator and Step S324 finds that the coolant temperature THW is equal to or higher than the threshold temperature THWR, the ECU 17 reads the elapsed time TIM since shutdown of the engine 60 clocked by the timer 86 (Step S330) and compares the elapsed time TIM with a threshold time TIMR (Step S332). The threshold time TIMR is used to discriminate whether or not the advance oil pressure chambers 13 and the retard oil pressure chambers 14 have been drained of oil owing to the slight clearance present between the casing 70 and the valve bodies 77 of spool 76 of the oil control valve 16. When oil has drained out of the advance oil pressure chambers 13 and the retard oil pressure chambers 14, an unusual sound arises when the engine 60 is started without fixing the open/close timing of the intake valves 62. To prevent the occurrence of this unusual sound, the elapsed time TIM is compared with the threshold time TIMR and the open/close timing of the intake valves 62 is changed depending on the result of the comparison.

Step 330 and Step 332 are executed when the signal to start the engine 60 is found to have come from the ECU 17 and are also executed even when the signal to start the engine 60 is found to have come from the operator if the coolant temperature THW is equal to or higher than the threshold temperature THWR. In the stop control of the engine 60 (FIG. 10) effected prior to this start processing, when it is found that the signal to start the engine 60 came from the ECU 17, it is also found that signal to stop the engine 60 came from the ECU 17. The open/close timing of the intake valves 62 is therefore set to the most retarded position (Step S308 in FIG. 10). Even if it is found that the signal to start the engine 60 came from the operator, when the coolant temperature THW of the engine 60 is equal to or higher than the threshold temperature THWR, the signal to stop the engine 60 is found to come from the operator but, here too, the open/close timing of the intake valves 62 is set to the most retarded position (Step S308 of FIG. 10) because the coolant temperature THW of the engine 60 is found to be equal to or higher than the threshold temperature THWR (Step S304 of FIG. 10). At the time of executing Step S330 and Step S332, therefore, the open/close timing of the intake valves 62 is always at the most retarded position.

When the elapsed time TIM is shorter than the threshold time TIMR, it is judged that the oil has not drained out of the advance oil pressure chambers 13 and the retard oil pressure chambers 14 and the engine is started (Step S336).

On the other hand, when the elapsed time TIM is equal to or longer than the threshold time TIMR, it is judged that the oil may have drained out of the advance oil pressure chambers 13 and the retard oil pressure chambers 14. The open/close timing of the intake valves 62 is therefore fixed by driving the oil control valve 16 to communicate the retard-side port 73 and the retard-side drain port 74 (Step S326), the generator-motor 69 is operated to rotate the crankshaft 68 backward by a prescribed angle (Step S328), and the engine 60 is started (Step S336). The purpose of driving the oil control valve 16 to communicate the retard-side port 73 and the retard-side drain port 74 is to ensure that, in the event that little or no oil has drained, the oil present in the retard oil pressure chambers 14 does not hinder movement of the vane 29. Since these steps fix the open/close timing of the intake valves 62 at the most advanced position, occurrence of an unusual sound at starting of the engine 60 is prevented.

The valve timing regulation system 10C according to the third embodiment explained in the foregoing enables the engine 60 to be started with the open/close timing of the intake valves 62 optimized for the temperature of the engine 60. Specifically, at the time of a cold start the open/closing times of the intake valves 62 are advanced to the maximum so as to increase the compression pressure of the air-fuel mixture in the compression stroke, thereby decreasing the starting difficulty of the engine 60, while at the time of a warm start the open/close times of the intake valves 62 are retarded to the maximum so as to lower the compression pressure of the air-fuel mixture in the compression stroke, thereby reducing vibration at and immediately after starting. In addition, the valve timing regulation system 10C predicts the temperature of the engine 60 at the next starting based on the type of signal for stopping the engine 60 and stops the operation of the engine 60 with the open/close timing of the intake valves 62 optimized for the predicted temperature. The starting of the engine can therefore be effected at appropriate open/close timing without regulating the open/close timing of the intake valves 62. Still further, the valve timing regulation system 10C estimates the likelihood of oil having drained from the advance oil pressure chambers 13 and the retard oil pressure chambers 14 based on the time elapsed since the engine 60 was stopped and starts the engine 60 after fixing the open/close timing of the intake valves 62 at the most advanced position when drainage of the oil is found likely, thereby avoiding occurrence of an unusual sound at engine starting.

Although the valve timing regulation systems 10, 10B and 10C according to the first, second and third embodiments were described as being applied to enable the close timing of the intake valves 62 to be regulated within a range considerably retarded from the bottom dead center of the crankshaft 68, they can be applied to enable regulation within any desired range beyond bottom dead center of the crankshaft 68.

Although the valve timing regulation systems 10, 10B and 10C according to the first, second and third embodiments were described as changing the open timing of the intake valves 62 at the same time as changing the close timing thereof, they can alternatively be configured to independently change the close timing and the open timing of the intake valves 62.

Although the valve timing regulation systems 10, 10B and 10C according to the first, second and third embodiments were described as being applied to the DOHC (double overhead camshaft) engine 60, they can instead be applied to an SOHC (single overhead camshaft) engine or an OHV (overhead valve) engine.

Although the valve timing regulation systems 10, 10B and 10C according to the first, second and third embodiments were described as being incorporated as valve timing regulation systems into a series hybrid electric vehicle, they can also be incorporated as valve timing regulation systems into a parallel hybrid electric vehicle using both an engine and a motor as driving power sources. Moreover, they are not only utilizable in hybrid electric vehicles but can also be incorporated into vehicles driven by conventional gasoline engines.

Although the foregoing embodiments were explained with respect to the case of utilizing the valve timing regulation system in a vehicle (automobile), the invention is not limited to this application and the system for regulating the valve timing of an internal combustion engine according to the invention can also be utilized in ships, aircraft, other means of transportation as well in various kinds of industrial machinery and the like.

The present invention has thus been shown and described with reference to specific embodiments. However, it should be noted that the present invention is in no way limited to the details of the described arrangements but can be implemented in various other ways without departing from the scope of the appended claims, such as by incorporation of the valve timing regulation system into ships, aircraft, other means of transportation, various kinds of industrial equipment and the like.

What is claimed is:

1. A valve timing regulation system for regulating at least close timing of an intake valve for opening/closing an intake port of an internal combustion engine, said valve timing regulation system comprising:

said intake valve operating in response to a rotation angle of a crankshaft for closing said intake port when said rotation angle of said crankshaft is in a prescribed range, timing changing means for changing said intake valve close timing by changing a response relationship of said intake valve with respect to said rotation angle of said crankshaft, condition detecting means for detecting a state of a condition affecting engine starting difficulty, timing setting means responsive to an engine start request for setting said intake valve close timing based on said state of said engine condition detected by said condition detecting means, and timing control means for controlling said timing changing means to cause said intake valve to be in a closed state at times defined by said set intake valve close timing at engine starting.

2. A valve timing regulation system in accordance with claim 1, wherein said timing setting means is means for setting said intake valve close timing to advance said intake valve closing times by a prescribed angle when said condition of said engine detected by said condition detecting means is in a prescribed state.

3. A valve timing regulation system in accordance with claim 2, wherein:

said timing changing means is an advance angle fixing means for fixing said response relationship of said intake valve with respect to said rotation angle of said crankshaft so that said intake valve close timing advances said intake valve closing times by said prescribed angle and said timing control means is means for controlling said advance angle fixing means based on said setting made by said timing setting means.

4. A valve timing regulation system in accordance with claim 3, further comprising:

an electric motor connected to said crankshaft for rotating said crankshaft, and wherein said timing control means is means for fixing said close timing by causing said motor to rotate said crankshaft backward by a prescribed angle based on said setting made by said timing setting means.

5. A valve timing regulation system in accordance with claim 4, wherein:

said timing changing means is provided with a retard chamber that has an in/out valve for entry/exit of a pressurized fluid and that changes said response relationship of said intake valve with respect to said rotation angle of said crankshaft in response to inflow of pressurized fluid and said timing control means is provided with valve opening control means for controlling said timing changing means to open said in/out valve when said crankshaft is rotated backward.

6. A valve timing regulation system in accordance with claim 1, wherein said timing setting means is means for setting said intake valve close timing to retard said intake valve closing times by a prescribed angle when said condition of said engine detected by said condition detecting means is in a prescribed state making said engine easy to start.

7. A valve timing regulation system in accordance with claim 6, wherein:
   said timing changing means is a retard angle fixing means for fixing said response relationship of said intake valve with respect to said rotation angle of said crankshaft so that said intake valve close timing retards said intake valve closing times by said prescribed angle and
   said timing control means is means for controlling said retard angle fixing means based on said setting made by said timing setting means.

8. A valve timing regulation system in accordance with claim 1, further comprising:
   advance angle fixing means for, by changing said response relationship of said intake valve with respect to said rotation angle of said crankshaft, fixing said intake valve close timing to fix said intake valve closing times at a prescribed advance angle,
   retard angle fixing means for, by changing said response relationship of said intake valve with respect to said rotation angle of said crankshaft, fixing said intake valve close timing to fix said intake valve closing times at a prescribed retard angle, and
   stop control means responsive to an engine stop request for controlling said intake valve close timing to set said intake valve closing times between said prescribed advance angle and said prescribed retard angle when said engine stops,
   said timing setting means being means for setting said intake valve close timing to advance said intake valve closing times by a prescribed angle when said condition of said engine detected by said condition detecting means is in a prescribed state and setting said intake valve close timing to retard said intake valve closing times by a prescribed angle when said condition of said engine is not in said prescribed state, and
   said timing control means being means for controlling either said advance angle fixing means or said retard angle fixing means based on said setting made by said timing setting means to fix said close timing so as to fix said valve closing times at said prescribed angle.

9. A valve timing regulation system in accordance with claim 8, further comprising:
   a motor for rotating said crankshaft,
   said timing control means including:
      advance control means for, when said timing setting means has set said intake valve close timing to advance said intake valve closing times by a prescribed angle, operating said motor to rotate said crankshaft backward by a prescribed angle to cause said advance angle fixing means to fix said valve closing times at said prescribed advance angle, and
      retard control means for, when said timing setting means has set said intake valve close timing to retard said intake valve closing times by a prescribed angle, operating said motor to rotate said crankshaft forward by a prescribed angle to cause said retard angle fixing means to fix said valve closing times at said prescribed retard angle.

10. A valve timing regulation system in accordance with claim 8, wherein:
    said timing changing means is provided with a retard chamber that has an in/out valve for entry/exit of a pressurized fluid and that changes said response relationship of said intake valve with respect to said rotation angle of said crankshaft in response to inflow of pressurized fluid and
    said timing control means is provided with valve opening control means for controlling said timing changing means to open said in/out valve when said crankshaft is rotated backward.

11. A valve timing regulation system in accordance with claim 1, wherein said condition detecting means is means for detecting a warm-up state of said internal combustion engine as said condition.

12. A valve timing regulation system in accordance with claim 1, wherein said condition detecting means is means for detecting elapsed time since shutdown of said internal combustion engine as said condition.

13. A valve timing regulation system for regulating at least close timing of an intake valve for opening/closing an intake port of said internal combustion engine, said system comprising:
    said intake valve operating in response to a rotation angle of a crankshaft for closing said intake port when said rotation angle of said crankshaft is in a prescribed range,
    timing changing means for changing said intake valve close timing by changing a response relationship of said intake valve with respect to said rotation angle of said crankshaft,
    condition predicting means responsive to an engine stop request for predicting based on said engine stop request a state of a condition affecting engine starting difficulty at a next engine starting,
    timing setting means for setting said intake valve close timing at said next engine starting based on said state of said engine condition predicted by said condition predicting means, and
    timing control means for controlling said timing changing means when said engine is stopped to cause said intake valve to be in a closed state at times defined by said set intake valve close timing.

14. A valve timing regulation system in accordance with claim 13, wherein said timing setting means is means for setting said intake valve close timing to advance said intake valve closing times by a prescribed angle when said condition of said engine predicted by said condition detecting means is in a prescribed state.

15. A valve timing regulation system in accordance with claim 14, wherein:
    said timing changing means is an advance angle fixing means for fixing said response relationship of said intake valve with respect to said rotation angle of said crankshaft so that said intake valve close timing advances said intake valve closing times by said prescribed angle and
    said timing control means is means for controlling said advance angle fixing means based on said setting made by said timing setting means.

16. A valve timing regulation system in accordance with claim 13, wherein said timing setting means is means for setting said intake valve close timing to retard said intake valve closing times by a prescribed angle when said condition of said engine predicted by said condition predicting means is in a prescribed state making said engine easy to start.

17. A valve timing regulation system in accordance with claim 16, wherein:

said timing changing means is retard angle fixing means for fixing said response relationship of said intake valve with respect to said rotation angle of said crankshaft so that said intake valve close timing retards said intake valve closing times by said prescribed angle and said timing control means is means for controlling said retard angle fixing means based on said setting made by said timing setting means.

18. A valve timing regulation system in accordance with claim 13, wherein said condition predicting means is means for predicting a warm-up state of said internal combustion engine as said condition.

19. A valve timing regulation system in accordance with claim 13, wherein said condition predicting means is means for predicting elapsed time since shutdown of said internal combustion engine as said condition.

20. A valve timing regulation method for regulating at least close timing of an intake valve for opening/closing an intake port of an internal combustion engine, said method comprising steps of:

providing said engine with intake valve operating control in response to a rotation angle of a crankshaft for closing said intake port when said rotation angle of said crankshaft is in a prescribed range, detecting a state of a condition affecting engine starting difficulty, receiving an engine start request, responding to said engine start request by setting said intake valve close timing based on said state of said engine condition detected, and changing said intake valve close timing to said set close timing by changing a response relationship of said intake valve with respect to said rotation angle of said crankshaft.

\* \* \* \* \*